Dec. 11, 1923.  1,477,170
G. C. GOODE
REAR AXLE GEARING
Filed Dec. 9, 1922  3 Sheets-Sheet 2

Inventor
Gilbert C. Goode
by
Thurston Kwis+Hudson
attys

Dec. 11, 1923.　　　　　　　　　　　　　　　　1,477,170
G. C. GOODE
REAR AXLE GEARING
Filed Dec. 9, 1922　　　　3 Sheets-Sheet 3

Inventor
Gilbert C. Goode
by
Thurston Kwis + Hudson
Attys

Patented Dec. 11, 1923.

1,477,170

UNITED STATES PATENT OFFICE.

GILBERT C. GOODE, OF EAST CLEVELAND, OHIO, ASSIGNOR TO THE WHITE MOTOR COMPANY, OF CLEVELAND, OHIO, A CORPORATION OF OHIO.

REAR-AXLE GEARING.

Application filed December 9, 1922. Serial No. C05,839.

*To all whom it may concern:*

Be it known that I, GILBERT C. GOODE, a citizen of the United States, residing at East Cleveland, in the county of Cuyahoga and State of Ohio, have invented a certain new and useful Improvement in Rear-Axle Gearing, of which the following is a full, clear, and exact description.

It is customary in the manufacture of motor vehicles for the manufacturer to select and install a proper train of gears between the driving shaft on a motor vehicle and the gears driving the rear axle which are of a proper ratio for the character of the work which the truck is to do. If it be desired to change this gear ratio for any reason, either to provide a ratio which will give greater speed to the vehicle, or one which will cause the operation of the vehicle at lower speed but greater effective power, it is necessary to practically dismantle the rear axle in order to make the desired changes.

The object accomplished by the present invention is to provide a construction associated with the rear axle housing by which the driving gear associated with the driven shaft may be removed with a minimum amount of trouble, and a gear having a greater or less number of teeth may be substituted and adjusted with relation to the gear which it drives without dismantling the rear axle or even necessitating the removal of the structure from the chassis.

Figure 1:
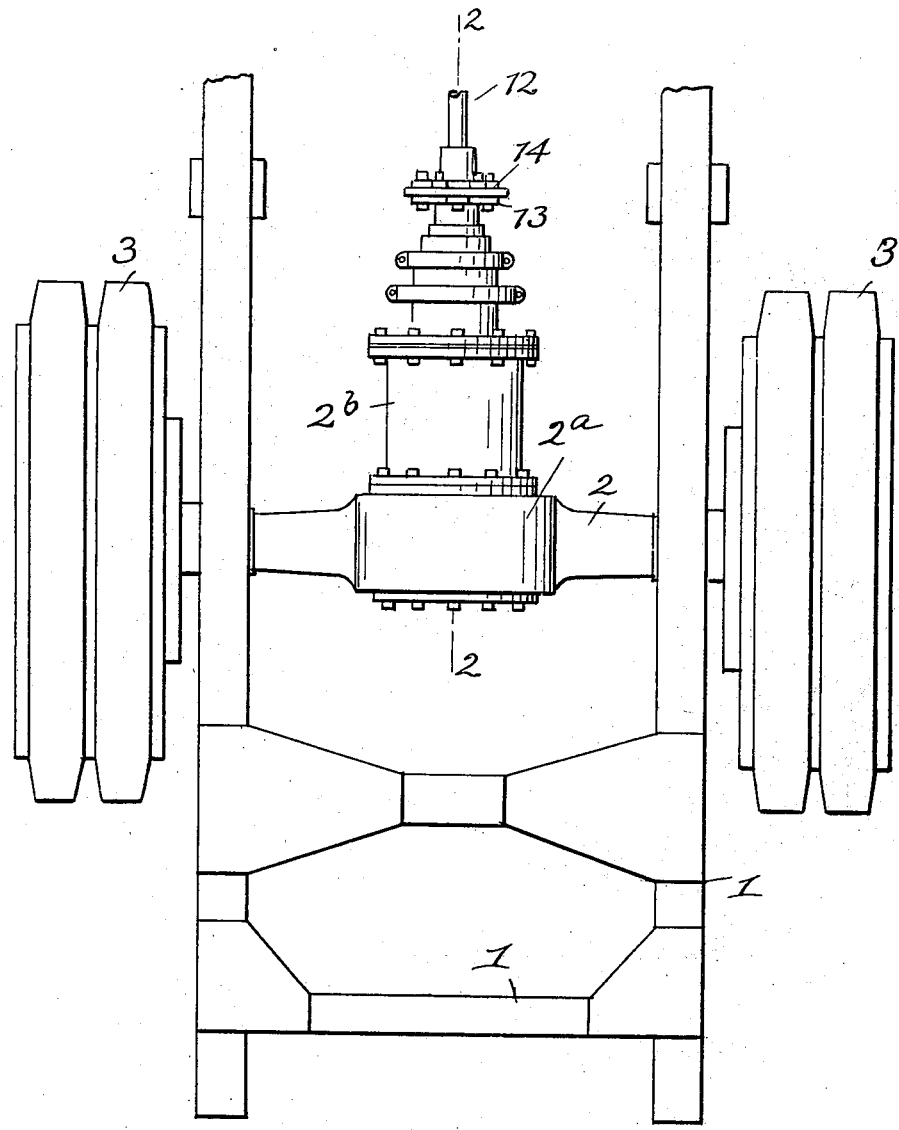
Figure 2:
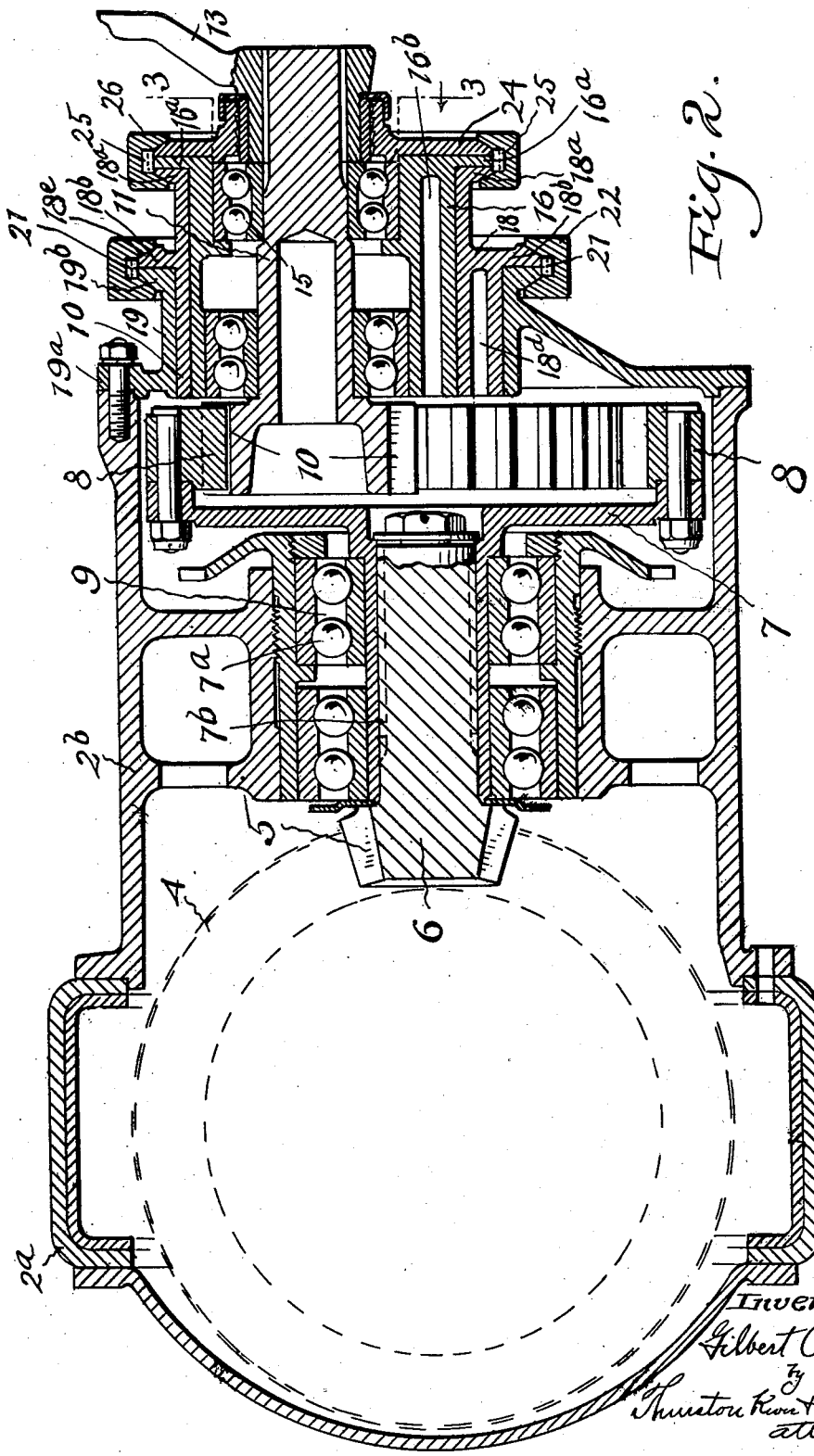
Figure 3:
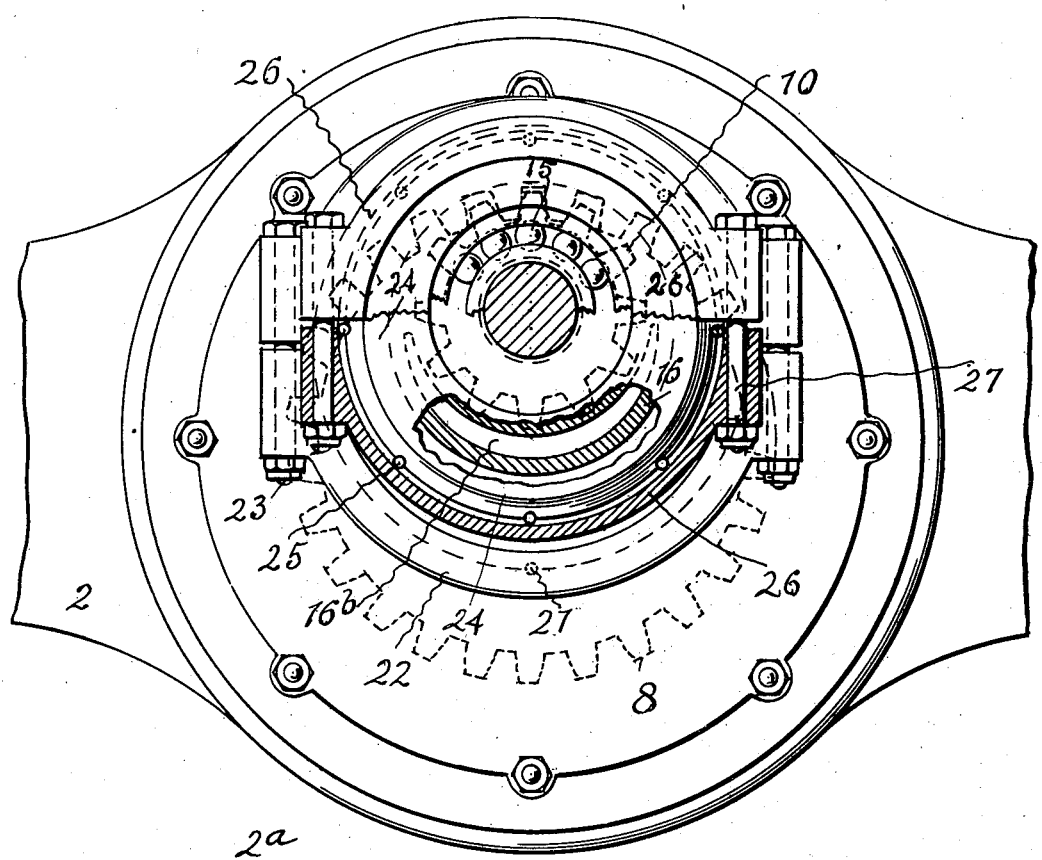

Reference should be had to the accompanying drawings forming a part of this specification, in which Fig. 1 is a top plan view of the rear portion of the chassis of a motor vehicle showing the wheels, rear axle, and rear axle housing, including the present invention; Fig. 2 is a sectional elevation on the line 2—2 of Fig. 1; Fig. 3 is a sectional elevation with portions in section on the line 3—3 of Fig. 2.

Referring to Fig. 1, the chassis may be generally represented at 1, the axle housing at 2, and the driven rear wheels at 3. The axle housing has a central enlarged portion $2^a$ which is customary in rear axle housings. Within the enlarged portion $2^a$ of the axle housing is a bevel gear 4 which is driven by means of a pinion 5. The bevel gear 4 serves to drive through a usual differential mechanism, not shown, the live axles within the housing 2 which are connected with the rear wheels 3. The foregoing construction is all old and well known in the art, and requires no further description here.

The pinion 5 has a shank 6 by which it is secured to the central portion of a disk 7 which disk carries upon one face thereof an internally toothed ring gear 8, the gear 8 being bolted or otherwise secured to the disk 7 so that in effect the disk 7 and the gear 8 are unitary.

In the present instance the disk 7 is provided with an extending sleeve portion $7^a$ which is adapted to receive the shank 6 of the pinion 5. These two may be secured together by means of a key $7^b$ if desired.

In the present instance the sleeve $7^a$ is mounted through the instrumentality of roller bearings 9 in a suitable portion $2^b$ which in effect forms an extension of the portion $2^a$ of the rear axle housing. This member $2^b$ is conveniently made as a separate piece and bolted to the housing $2^a$, as is clearly indicated in Fig. 1.

The ring gear 8 is driven by means of a pinion 10 which meshes therewith, and the pinion is preferably supplied with a rearwardly extending shank 11, which at its end portion may be connected in any suitable way with a driving shaft 12 (see Fig. 1) which extends forward to the transmission of the motor vehicle.

As shown in the drawing, the shank of the pinion 10 is connected with a spider 13 which forms one element of a flexible connection, which is generally indicated at 14 in Fig. 1, between the driving shaft 12 and the shank 11 of the pinion 10.

The shank 11 is mounted in ball bearings, which are indicated at 15, and the bearings themselves are mounted in a sleeve 16 which sleeve at its outer end has an outwardly extending flange $16^a$.

The sleeve 16 is mounted to be capable of turning within an outer sleeve 18, and this sleeve has at one end an outwardly extending flange $18^a$, and intermediate its ends it has a radially extending flange $18^b$. This outer sleeve 18 also has a cylindrical surfaced portion, as indicated at $18^c$, which is adapted to telescope with a cylindrical member 19, which member at one end has a flange $19^a$ by which the member 19 may be bolted or otherwise secured upon the extension $2^b$ of the differential housing. The cylindrical member 19 also has a flange at the other end, as indicated at $19^b$.

Each of the sleeve members 16 and 18 for the purpose of lightening the structure may have portions of the metal removed by the provision of suitable openings, such as indicated at $16^b$ and $18^d$.

The flange $19^b$ of the member 19 and the flange $18^b$ of the sleeve 18 have engaging surfaces, and when the parts are assembled these surfaces are in engagement. The relative rotation between these parts is prevented by the insertion of dowel pins through suitable openings which are provided with the flanges $19^b$ and $18^b$; these dowel pins being suggested at 21, and there may be as many such connecting dowel pins as may be desired. These dowel pins prevent relative rotation.

For the purpose of holding the flanges $19^b$ and $18^b$ together, a ring member 22 is provided, which is a two-part ring member, a shown in Fig. 3, the two parts of the ring being secured together by means of bolts 23. In order to provide a wedging action, the inner surface of the ring 22 may be V-shaped, as indicated at $22^a$, and the outside surfaces of the flanges $19^b$ and $18^b$ may be beveled in order to co-operate with the surfaces upon the inner portion of the ring 22. It will be obvious that when the bolts 23 for the ring 22 are tightened the flanges $19^b$ and $18^b$ will be wedged together.

At the end of the sleeve 16 there is an end plate 24 which is provided with a central opening through which extends the shank 11 of the pinion 10, and this opening may be provided with a suitable packing to prevent grease from working out. The plate 24 lies against the flange $16^a$ of the sleeve 16.

The flange $16^a$ also lies in contact with the flange $18^a$, and relative rotation between the sleeves 16 and 18 is provided by means of dowel pins 25 which extend through aligned openings in the flanges $16^a$ and $18^a$, and also through the outer portion of the plate 24, the various elements mentioned being provided with a plurality of openings and a plurality of dowel pins. Co-operating with the flanges $16^a$ and $18^a$ and with the outer portion of the plate 24 is a ring 26 which upon its inner surface is provided with a V-shaped groove that co-operates with slanting surfaces on the flange $18^a$ and the plate 24. This ring 26 is a two-part ring, as will be seen from Fig. 3, the parts of which are secured together by means of bolts 27 so that as the ring parts are drawn together the flanges of the sleeves 16 and 18, as well as the end plate 24 are firmly held against longitudinal movement.

When it is desired to change the spur gear 10 either for repair purposes or to substitute another spur gear having a greater or lesser number of teeth in order to produce a different driving ratio, it will be seen that the removal may be readily accomplished by disconnecting the shank 11 from the spider 13, and then by loosening the bolts which hold the flange $19^a$ of the cylindrical member 19 which will permit the spur gear and its associated sleeves to be removed.

Upon removal the gear 10 may be removed and a new gear substituted, and in order to provide a correct positioning of the spur gear 10 so that it may be assembled with respect to the ring gear 8, the sleeves 16 and 18 may be relatively adjusted, as will now be described.

Each of the sleeves 16 and 18 are eccentrically mounted with respect to the axis of the shank 11, so that by rotary movement of the sleeves 16 and 18 the axis of the shank 11 may be varied or adjusted with respect to the axis of the ring gear 8. Therefore, when it is desired to change the ratio between the gears 8 and 10 and the spur gear 10 is removed in the manner before described, and a new spur gear with its shank is substituted, the new spur gear thus substituted may be brought into proper relationship with respect to the gear 8 by adjustment of the sleeves 16 and 18, and when the proper adjustment is found the sleeves may be held in their adjusted position by means of the dowel pins 21 and 25, as before described.

It will, of course, be obvious that as a manufacturing proposition the correct positioning of the sleeves 16 and 18 so as to accommodate and correctly position a plurality of different spur gears 10 of different numbers of teeth may be determined, and the positions directly indicated upon the flanges associated with the sleeves 16 and 18, thereby making the substitution of a new spur gear 10 a matter of certainty without a cut and tried adjustment.

It will be seen from the foreging description that the matter of changing the driving ratio may be very readily accomplished without dismantling the rear axle or even removing it from the chassis of the machine on which it is mounted.

Having described my invention, I claim:—

1. In a vehicle construction, the combination with a rear axle housing, live axles within the housing, a gear from which said live axles are driven, a pinion for driving said gear, a second gear to which the said pinion is secured to rotate therewith, a third gear which meshes with the second gear, a mounting for said third gear, the said mounting being adjustable with respect to the center line of the second mentioned gearing.

2. In a vehicle construction, the combination with a rear axle housing, live axles within the housing, a gear from which said live axles are driven, a pinion for driving said gear, a second gear to which the said pinion is secured to rotate therewith, a third gear which meshes with the second gear, a mounting for said third gear said mounting being adjustable whereby the distance between the center line of the third gear and the center line of the second gear may be adjusted.

3. In a vehicle construction, the combination with a rear axle housing, live axles within the housing, a gear from which said live axles are driven, a pinion for driving said gear, a second gear to which the said pinion is secured to rotate therewith, a third gear which meshes with the second gear, a mounting for said third gear comprising a rotatable sleeve, the axis of rotation of said sleeve being eccentric with respect to the center line of the third gear whereby rotation of said sleeve will vary the distance between the center line of the third gear and the center line of the second gear.

4. In a vehicle construction, the combination with a rear axle housing, live axles within the housing, a gear from which said live axles are driven, a pinion for driving said gear, a second gear to which the said pinion is secured to rotate therewith, a third gear which meshes with the second gear, a mounting for said third gear comprising a pair of telescoping sleeves each of said sleeves being so mounted that the center line is eccentric with respect to the center line of the said third gear, a relative movement of said sleeves serving to vary the distance between the center line of the third gear and the center line of the second gear.

5. In a vehicle construction, the combination with a rear axle housing, live axles within the housing, a gear from which said live axles are driven, a pinion for driving said gear, a second gear to which the said pinion is secured to rotate therewith, a third gear which meshes with the second gear, a mounting means for said third gear said mounting means being detachably carried by a portion of the rear axle housing whereby said third gear and its mounting may be removed.

6. In a vehicle construction, the combination with a rear axle housing, live axles within the housing, a gear from which said live axles are driven, a pinion for driving said gear, a second gear to which the said pinion is secured to rotate therewith, a third gear which meshes with the second gear, a mounting for said third gear which is adjustable to vary the distance between the center line of the third gear and the center line of the second gear, the said mounting for the third gear being detachably carried by a portion of the rear axle housing whereby the said third gear and its adjustable mounting may be disassembled from the rear axle housing.

7. In a vehicle construction, the combination with a rear axle housing, live axles within the housing, a gear from which said live axles are driven, a pinion for driving said gear, a second gear to which the said pinion is secured to rotate therewith, a third gear which meshes with the second gear, said third gear having an extending shank, bearings in which said shank is mounted, a rotatable sleeve in which said bearings are carried, and a second rotatable sleeve outside of the first mentioned sleeve, a member having an opening through which the said outside sleeve extends, said member being secured to a portion of the rear axle housing, means by which the outside sleeve is secured in adjusted position with respect to said member, and other means whereby the inside sleeve is secured with respect to the outside sleeve.

8. In a vehicle construction, the combination with a rear axle housing, live axles within the housing, a gear from which said live axles are driven, a pinion for driving said gear, a second gear to which the said pinion is secured to rotate therewith, a third gear which meshes with the second gear, said third gear having an extending shank, bearings in which said shank is mounted, a rotatable sleeve in which said bearings are carried, and a second rotatable sleeve outside of the first mentioned sleeve, a member having an opening through which the said outside sleeve extends, said member being secured to a portion of the rear axle housing, means by which the outside sleeve is secured in adjusted position with respect to said member, and other means whereby the inside sleeve is secured with respect to the outside sleeve, each of said sleeves being mounted so that its center line is eccentric with respect to the center line of the third gear and its shank whereby relative rotation of the said sleeves will serve to vary the distance between the center line of the third gear and the center line of the second gear.

In testimony whereof, I hereunto affix my signature.

GILBERT C. GOODE.